Patented Mar. 3, 1925.

1,528,398

UNITED STATES PATENT OFFICE.

BENJAMIN T. BROOKS, OF SOUND BEACH, CONNECTICUT, AND HARRISON O. PARKER, OF HOWARD BEACH, NEW YORK, ASSIGNORS TO THE MATHIESON ALKALI WORKS, INC., OF NEW YORK, N. Y., A CORPORATION OF NEW YORK.

REFINING OF CRACKED GASOLINE.

No Drawing.　　Application filed December 18, 1922.　Serial No. 607,740.

*To all whom it may concern:*

Be it known that we, BENJAMIN T. BROOKS and HARRISON O. PARKER, citizens of the United States, residing, respectively, at Sound Beach, in the county of Fairfield, State of Connecticut, and Howard Beach, in the county of Queens, Long Island, New York, have invented certain new and useful Improvements in the Refining of Cracked Gasoline; and we do hereby declare the following to be a full, clear, and exact description of the invention, such as will enable others skilled in the art to which it appertains to make and use the same.

This invention relates to an improved method of refining gasoline and similar products obtained by the cracking of heavier oils, for example, products such as pressure distillates obtained by cracking kerosene or gas oil under pressure.

In treating cracked gasoline or pressure distillate with a hypochlorite solution for the removal or oxidation of objectionable sulphur compounds, the treated product may still retain an objectionable yellowish color which is not destroyed by the hypochlorite treatment or which may even be due to a greater or less extent to such treatment.

The present invention is based upon the discovery that the objectionable color of such cracked products, after treatment with hypochlorite, can be removed and a water-white product readily obtained by adding a very small amount of aluminum chloride and redistilling.

The invention will further be illustrated by the following specific example of its application to the treatment of a pressure distillate or cracked gasoline containing around 85% gasoline and 15% kerosene. This gasoline product is first agitated with an aqueous caustic soda solution, for example, using a 10% caustic soda solution and from 5 to 10% by volume of such solution. The amount of the caustic soda solution will depend somewhat upon the nature and amount of the sulphur compounds present but an excess facilitates the treatment and the caustic soda solution can be used over again with preliminary deodorization by blowing with steam, if necessary. This preliminary caustic alkali treatment is advantageous with certain oils in removing sulphur compounds which corrode copper.

After the preliminary caustic alkali treatment the gasoline is then subjected to treatment with a hypochlorite solution, for example, of calcium hypochlorite made by absorbing chlorine in milk-of-lime and containing from 10 to 30 grams of chlorine per liter. The amount of the hypochlorite solution will depend upon the sulphur content of the oil and may vary for example between 0.2 and 2.0 lbs. of chlorine per barrel of gasoline. In general, around three-quarters of a pound to one pound of chlorine as hypochlorite is sufficient for the treatment of gasoline containing around 0.3 to 0.4% of sulphur. The time of treatment will also vary with the nature and amount of sulphur compounds present and may be, for example, between 30 minutes and 1½ hours.

After the hypochlorite treatment the treated oil is dehydrated, for example, by gentle heating or refluxing and a trace of anhydrous aluminum chloride is added, for example, around 0.5% by weight. The gasoline is then subjected to redistillation by gentle external heat. By dry distillation in this way, i. e., without using steam, the distillate can be obtained in the form of a sweet water-white distillate substantially free both from sulphur compounds and from objectionable color.

The improved process of the present invention can advantageously be combined with the usual methods of handling pressure distillate or cracked gasoline and in which the product requires redistillation to obtain the finished gasoline product. By preliminarily treating the product before redistillation in the manner above described it can be freed from objectionable sulphur compounds while by carrying out the redistillation with the addition of traces of aluminum chloride the distillate obtained on redistillation is also water-white and freed from objectionable yellow color.

Instead of using aluminum chloride in the redistillation a small amount of other chlorides can be similarly used, for example, of zinc chloride.

We claim:

1. The method of refining cracked hydrocarbon distillates which comprises subjecting the same to treatment with a hypochlorite solution, and subsequently distilling the same in the presence of a trace of aluminum chloride.

2. The method of treating cracked hydrocarbon distillates which comprises subjecting the same to treatment with a caustic alkali solution, subsequently subjecting the same to treatment with a hypochlorite solution, and re-distilling the treated product in the presence of a trace of aluminum chloride.

3. The method of refining cracked hydrocarbon distillates which comprises subjecting the same to treatment with a hypochlorite solution, and subsequently distilling the same in the presence of aluminum chloride.

In testimony whereof we affix our signatures.

BENJAMIN T. BROOKS.
HARRISON O. PARKER.